(12) United States Patent
Burke

(10) Patent No.: US 7,264,153 B1
(45) Date of Patent: Sep. 4, 2007

(54) FINAL SALE MERCHANDISE CARD

(76) Inventor: Bertram V. Burke, 34 Navesink Dr., Monmouth Beach, NJ (US) 07750

( * ) Notice: Subject to any disclaimer, the term of this patent is extended or adjusted under 35 U.S.C. 154(b) by 0 days.

(21) Appl. No.: 10/823,850

(22) Filed: Apr. 14, 2004

Related U.S. Application Data

(60) Provisional application No. 60/462,732, filed on Apr. 14, 2003.

(51) Int. Cl.
*G06K 5/00* (2006.01)

(52) U.S. Cl. .................. 235/380; 235/385; 705/17; 705/22

(58) Field of Classification Search ........ 235/378–381, 235/385; 705/52, 53, 64–66, 69, 75, 76, 705/22, 26–28, 41, 39, 14, 16, 17, 20, 30, 705/34, 37
See application file for complete search history.

(56) References Cited

U.S. PATENT DOCUMENTS

| | | | | |
|---|---|---|---|---|
| 4,650,978 A | * | 3/1987 | Hudson et al. ............. | 235/380 |
| 4,968,873 A | * | 11/1990 | Dethloff et al. ............ | 235/380 |
| 5,732,136 A | * | 3/1998 | Murphree et al. ........... | 705/77 |
| 5,753,899 A | * | 5/1998 | Gomm et al. ............... | 235/381 |
| 5,902,984 A | * | 5/1999 | Planke ....................... | 235/381 |
| 6,847,938 B1 | * | 1/2005 | Moore ........................ | 705/26 |
| 6,907,405 B2 | * | 6/2005 | Brett .......................... | 705/37 |
| 2001/0047342 A1 | * | 11/2001 | Cuervo ....................... | 705/66 |
| 2003/0004828 A1 | * | 1/2003 | Epstein ....................... | 705/26 |
| 2003/0007615 A1 | | 1/2003 | Parfait et al. | |
| 2003/0061170 A1 | * | 3/2003 | Uzo ............................. | 705/64 |
| 2003/0105672 A1 | * | 6/2003 | Epstein et al. ............... | 705/26 |
| 2003/0225625 A1 | * | 12/2003 | Chew et al. ................. | 705/24 |
| 2004/0182922 A1 | | 9/2004 | Talarico | |

\* cited by examiner

*Primary Examiner*—Ahshik Kim
*Assistant Examiner*—Kumiko C. Koyama

(57) ABSTRACT

A system for activating a merchandise card and account that permits a card user to initially purchase or reload cash value into a merchandise account using a card issued by an issuer such as a merchant, bank, or card association via a terminal, with or without a PIN, and have the cash value on the card immediately converted to a purchase of proxy merchandise offered by the card issuer, and at the time of account debiting allowing said cardholder to make a final selection of merchandise from the inventory of the issuing merchant. The system operates a network, on a real time or batch basis, that uses a communication system to connect point of sale terminals, remote terminals, and computers operated by card issuers, merchant headquarters, and account processors to issue cards, calculates taxes and merchant costs, converts cash to proxy merchandise, and allows cardholders at the time of debiting their account to substitute the proxy purchase for a final selection of merchandise.

35 Claims, 8 Drawing Sheets

1. On 3-17-03, a customer purchases a card for $100.00 in store #141.
2. The remote terminal RT goes online to Merchant Headquarters MH station to look up proxy sales tax experience for the merchant.
3. For this MH, the chain reports an average transaction has a 3% sales tax.
4. RT reports the transaction to the Account Processor AP station as transaction #1234 for the full amount of $100.00 and credited to cardholder account #35-476-12.
5. Either in real time or at the time the cash drawer or RT is closed out, the information on transaction #1234 is reported to MH station.
6. At the MH station, computers record the proxy sale of transaction #1234 for $100.00 as follows:
   $3.00 state sales tax
   $55.00 cost of goods
   $28.00 overhead costs
   $14.00 net profit
   $7.98 after tax profit
7. On 4-2-03 cardholder #35-476-12 debited $15.83 at store #151 preforming transaction #6890. The following two items were purchased:
   Item 1-24 cans of premium soda-Price $8.43 -Sale Tax 6%=$0.50
   Item 2-1 women's blouse -Price $6.45 -Sake Tax 0% =$0.00
   Total purchase $15.38
8. The RT will go online to AP station and debit $15.38 leaving a balance of $84.62 on account #35-476-12.
9. When MH station receives the transaction the 2 records are recorded as follows:
   Transaction #1234 is rewritten as $84.36 with the following apportionments:
   $2.53 state sales tax
   $46.40 cost if goods
   $23.62 overhead costs
   $11.81 net profit
   $6.73 after tax profit Transaction #6890 is written for $15.38 with the following apportionments:
   Item 1 - price $8.43
   $0.51 state sales tax (@6%)
   $3.54 cost of goods (@42%)
   $1.94 overhead costs (@23%)
   $5.99 net profit Item 2 - price $6.45
   $0.00 state sales tax (@0%)
   $3.03 cost of goods (@47%)
   $1.55 overhead costs (@24%)
   $1.87 net profit Items 1 & 2 After tax profit = $4.48

FIG. 8

FINAL SALE MERCHANDISE CARD

Applicant claims the benefit of U.S. Application No. 60/462,732 filed Apr. 14, 2003.

FIELD OF THE INVENTION

This invention relates to the gift card, prepaid card, or traveler's money card.

BACKGROUND OF THE INVENTION

In 2003 consumers purchased $45 billion in stored value card (SVC) credits from card issuers who are retailers, mall offices, banks, card associations, and travel service providers. In the marketplace SVC are commonly referred to as gift, prepaid, or traveler's money card programs.

The majority of SVC issuers provide consumers with mag strip cards that are connected to a host-client network system. Consumers use their cards to initially load and reload funds at remote terminals, e.g. cash registers, POS terminals, Internet web site POS terminals, etc.

After value has been added to a SVC, consumers use their card to make purchases for goods and/or services at (a) merchants who issue cards (a "closed" loop system) or (b) banks who issue cards and provide cardholders with the opportunity to use their cards at multiple and diverse merchants (an "open" system).

In return for selling and reloading SVCs, merchants have benefited by consumers spending more than the face value of the card, the float on the money held in their SVC account until the funds are debited, and the "breakage" amount that occurs when customers abandon 10–15% of the funds that they deposited into a SVC account.

When banks sell SVC cards, they benefit from charging customers loading fees on the amount of funds they deposit, float fees on the funds maintained in the accounts, and interchange fees when customers make purchases at participating merchants or use ATM machines for cash.

Along with the outstanding success that merchants and banks are gaining from offering the current SVC programs, they are also experiencing the following problems (a) Consumers do not own any merchandise or services when they purchase SVC credits; therefore, if an issuer goes out of business or becomes insolvent, the consumers loses the funds they deposited into their SVC funds. (b) When issuers accept SVC funds, they cannot be recorded as an immediate sale; therefore, the issuer cannot report the transaction as revenue. (c) Issuers have to wait until cardholders debit their accounts before they can declare any revenue. (d) The "breakage" amount that occurs when customers abandon 10–15% of the funds, has until recently been the property of the issuer. Now issuers are being challenged by state treasuries, invoking existing "unclaimed property laws", to turn over the funds to the state. As the impact of this process expands, it is entirely possible that merchants will lose all rights to the "breakage" funds that they were formerly able to keep. (e) Furthermore, with the introduction of state treasuries in the mix, issuers are now being required to maintain costly SVC accounting records and conduct audits for yearly reporting to the respective state treasuries. (f) In order to deal with the growing elimination of "breakage" funds, issuers have attempted to put expiration dates on their SVCs. As a result of this very unpopular tactic, a growing number of states have outlawed issuers from using expiration dates for SVCs. and (g) As another way to recoup from losing "breakage" funds, issuers have also instituted monthly charges (avg. $2.50) when SVC accounts are not being used. In response to this compensatory initiative, again a growing number of states have passed laws blocking issuers from charging non-user fees.

In analyzing the above cited problems, it is obvious there are two major limitations within the current SVC system. They are (a) issuers accept funds from consumers with the expectation that they have made a sale and (b) consumers turn over funds to issuers with the understanding they now own some merchandise or services, for themselves or as a gift for others.

However, in reality, both parties do not receive what they want. The fact is issuers are really selling "financial credits" to consumers for future ownership of goods or services.

In the future, such "credits" can then be exchanged for merchant supplied goods and services. Consequently, under the current system, merchants do not have a sale until the customer cashes the "credits" in for goods and services. Therefore, as it now stands, merchants do not have any guarantee that there will ever be a sale.

Under the current system merchants have to wait until the customer redeems the financial credits for goods or services. Only at that time does a merchant have reportable revenue from their growing sales of gift, prepaid, or traveler's money cards. As a result of the delay in timing, merchants are increasingly being forced to under report what they think are their legitimate sales. By increasingly under reporting their sales, merchants now are asking the question: "Will this phenomena, have a negative impact on their corporate earnings, valuations, and the price of their company's stock?"

Lastly, after a time of nonuse, some states are viewing the remaining balances in SVCs as being "unclaimed property". Under such a declaration, state treasuries can implement escheat laws and require issuers to surrender the unused funds to the respective state treasuries.

Once "unclaimed property" laws are called to action—customers, issuers, city and state sale tax authorities, and the Internal Revenue Service—will all lose the rights to the funds that issuers and consumers—upfront agreed—to be used to conveniently purchase goods and services.

Accordingly, in light of the above, it would be advantageous to improve the existing gift, prepaid, traveler's money cards so that once funds are entered into the system there is an immediate and recognizable sale of goods or services. Once this occurs, all the above cited problem factors ("a" through "g") by definition and classification are eliminated from occurring. The method and system that can provide order and purpose to this payment option is a merchandise card.

SUMMARY OF THE INVENTION

An embodiment of the invention allows consumers to enter cash value into a merchandise card account and immediately have the issuer record the transaction as revenue from a sale of goods and/or services.

According to another embodiment of the invention, merchants or issuers will be able to convert the cash value entered into a merchandise card account—into a sale of proxy merchandise—after they calculate and report the average historical costs associated with the merchant's or issuer's inventory. The merchant's or issuer's costs to be considered would be (1) the applicable city, state, federal taxes and (2) the cost of the sold goods and overhead. Within this embodiment, at the time of the proxy purchase, cardholders will be buying a percentage of the merchant's or issuer's inventory. While making the purchase, under the terms of the merchandise card, the merchant or issuer agrees to hold and store the purchased inventory until the cardholders make a final inventory selection.

According to another embodiment of the invention, at a later time cardholders will be able to reconfigure and exchange the initial sale of proxy merchandise for other goods or services. The final selection of merchandise or services selected by the cardholder will then be recalculated by the invention to determine (1) the applicable city, state, federal taxes and (2) the cost of the sold goods and overhead related to the final merchandise selected by the cardholder. Effectively, once the final selection of inventory occurs, the final transaction log will replace whatever percentage of the initial proxy purchase was used up. Also, at time of the final purchase, cardholders will take the purchased inventory items away from the merchant's location.

According to another embodiment of the invention, in the event that merchants or issuers go bankrupt or become insolvent, the invention will be able to provide the court with records indicating the percentage of the merchant's or issuer's inventory that is owned by the merchandise cardholders. Once this occurs the court will have the needed knowledge to instruct the merchant, issuer, or trustee how much of the existing inventory should be made available to the existing merchandise cardholders. The court could then instruct the party in charge to set up claming sites whereupon the merchandise cardholder will be able to select from available inventory.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 8 shows an example of a merchant card transaction in operation.

Figure 1:
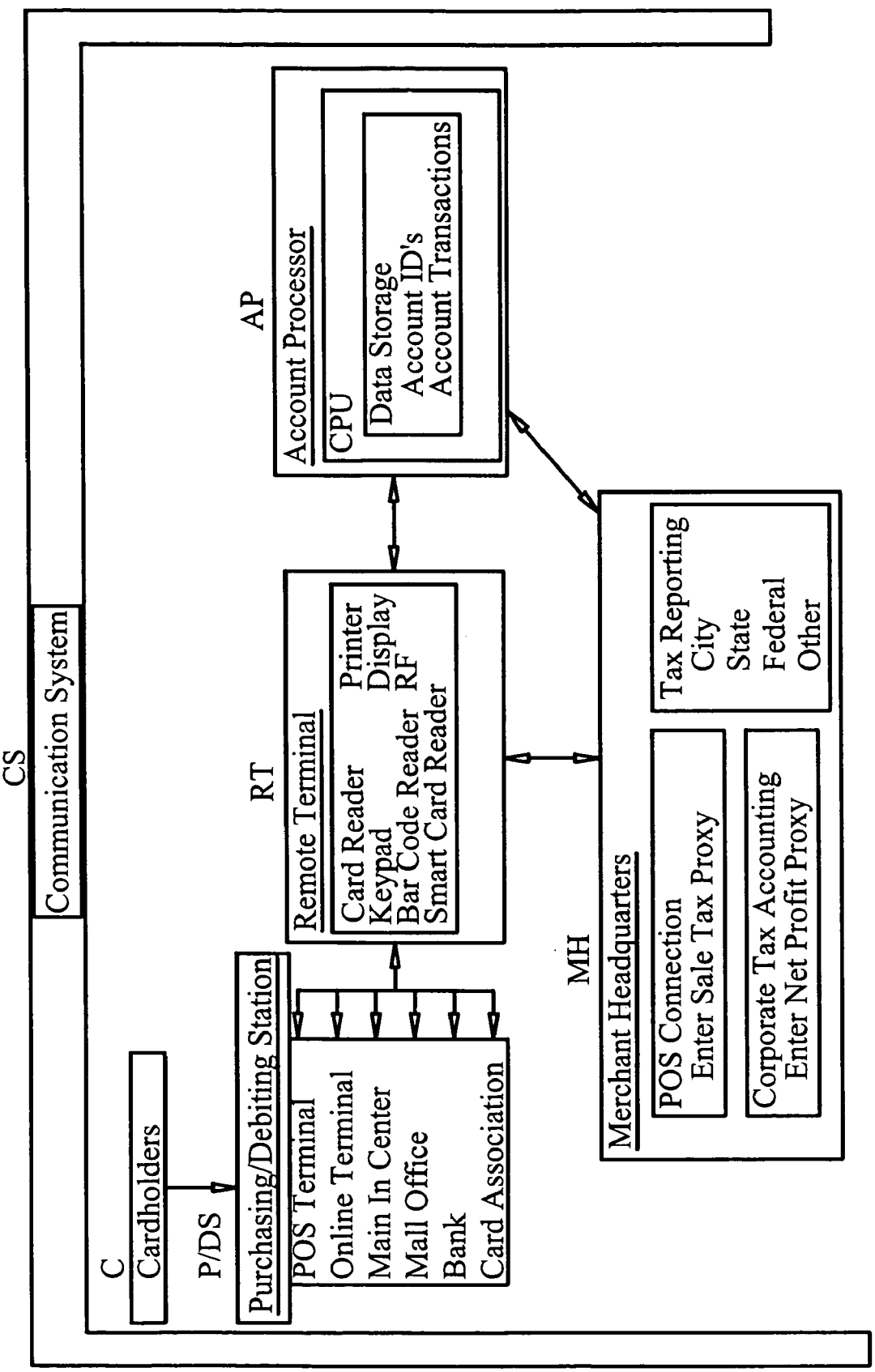
FIG. 1 is a block diagram of the components of a system operated by a merchant and a third party to allow a merchandise card system to make an initial "proxy purchase" followed by an adjusted "final purchase" of goods and/or service in accordance with the invention.

Throughout the figures, unless otherwise stated, the same reference numerals and characters are used to denote like features, elements, components, or portions of the illustrated embodiments. Moreover, while the subject invention will now be described in detail with reference to the figures and in connection with the illustrative embodiments, changes and modifications can be made to the described embodiments without departing from the true scope and spirit of the subject invention as defined by the appended claims.

DETAILED DESCRIPTION OF THE INVENTION

The invention describes a method and system for activating a merchandise card MC and a merchandise account MA that permits a cardholder CH to deposit cash into a merchandise account MA for the purpose of the cash being immediately used to purchase a percentage of the merchant's or card issuer's inventory.

After the transaction is completed the cardholder's merchandise card account will show a record of the transaction and the amount of cumulative inventory owned by the cardholder.

This purchasing transaction is called a proxy transaction PT because at the time of purchase the cardholder instructs the selling merchant or issuer to maintain possession of the inventory until a later time when the cardholder will return to make a final selection FS from the merchant's inventory.

In order to effect the invention, the system requires a network of players, see FIG. 1 composed of cardholders, merchants, card issuers, processors, etc. who process transactions using remote terminals and central computers to load, reload, and debit against merchandise card accounts using the following stations (1) a purchasing/debiting P/DS station, (2) a merchant headquarters station MH, and (3) an account processor station AP.

Figure 2:
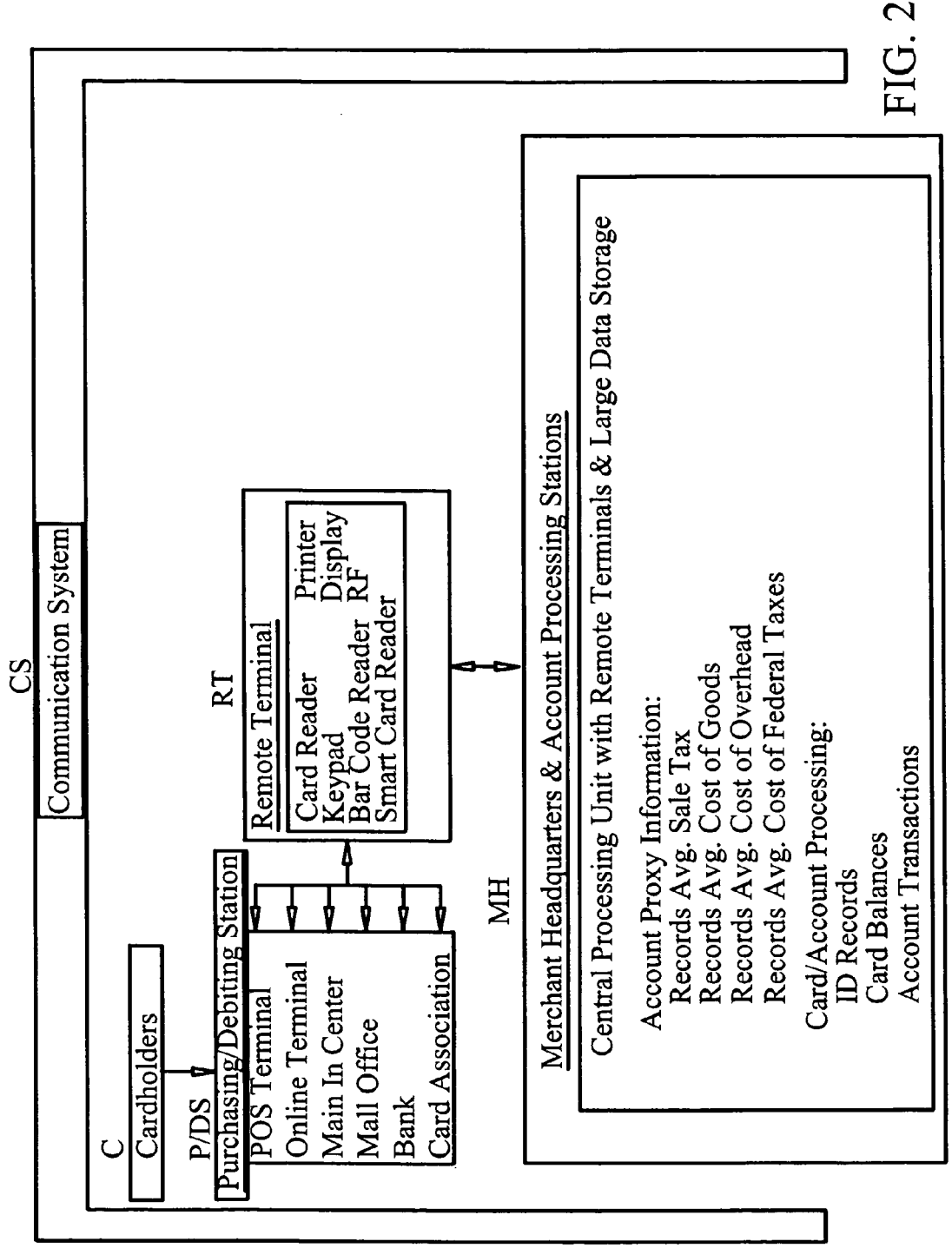
FIG. 2 is a block diagram of the components of a system fully operated by the merchant alone to allow a merchandise card to make an initial "proxy purchase" followed by an adjusted "final purchase" of goods and/or service in accordance with the invention.

FIG. 2, shows the three stations in the network (P/DS, MH, AP) being operated by the merchant organization.

Figure 3:
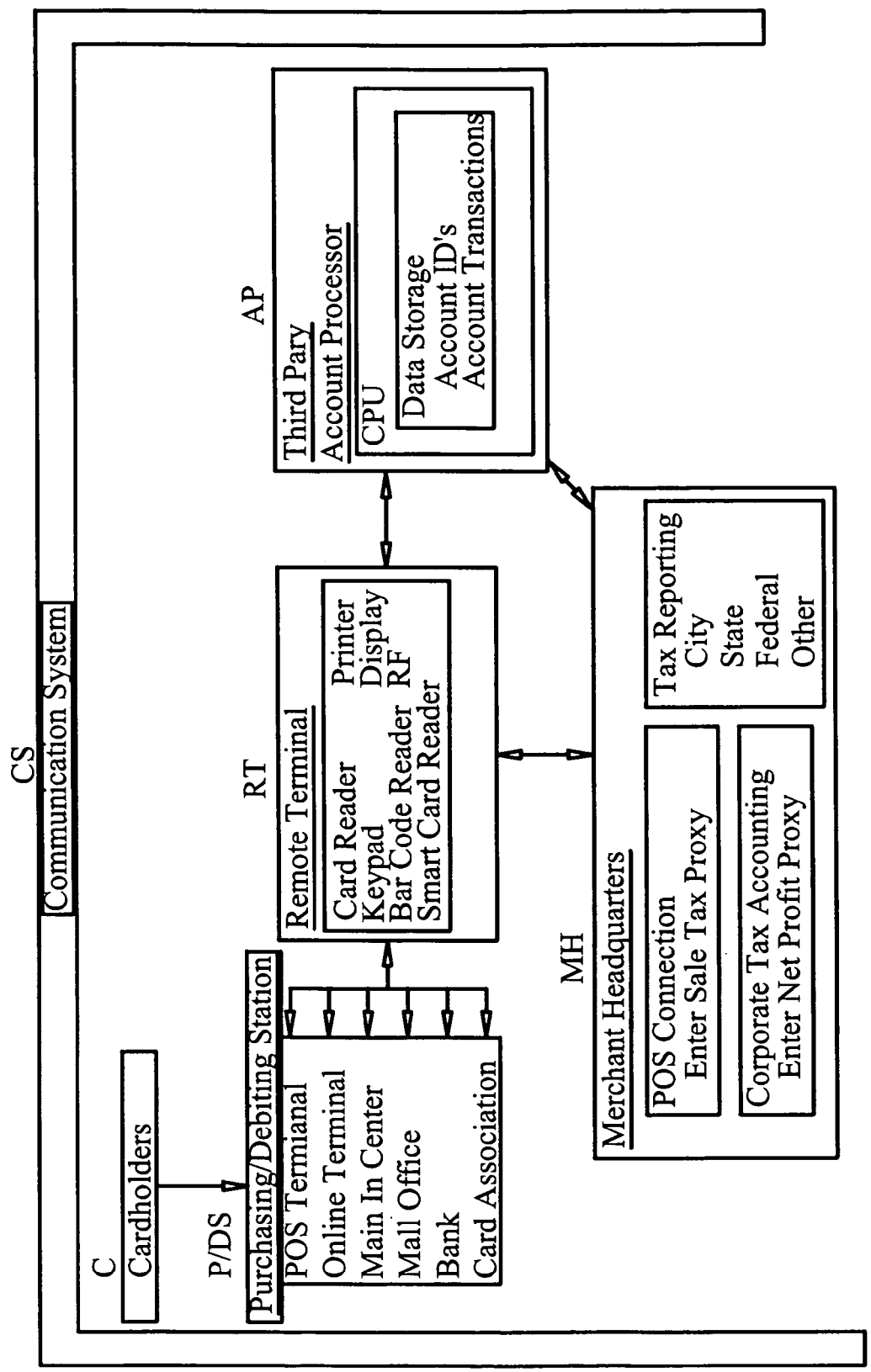
FIG. 3 is a block diagram of the components of a system operated by a bank or a card association to allow a merchandise card to make an initial "proxy purchase" followed by an adjusted "final purchase" of goods and/or service in accordance with the invention.
Figure 4A:
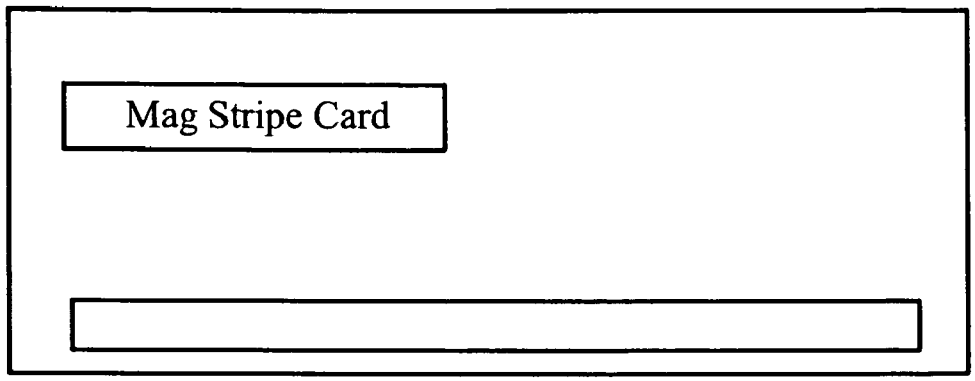
FIG. 4A illustrates a financial transaction card incorporating mag stripe technology with a unique ID account number connecting to a cardholder's merchandise card account.
Figure 4B:
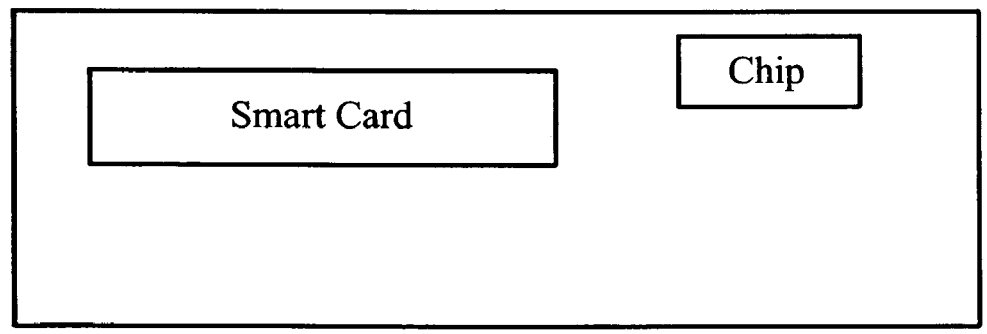
FIG. 4B illustrates a smart card incorporating integrated circuit technology to convey a unique ID account number connected to a cardholder's merchandise card account.
Figure 4C:
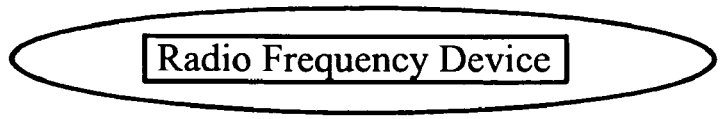
FIG. 4C illustrates a radio frequency device being used as the conveyor of a unique ID account number connected to a cardholder's merchandise card account.

FIG. 3, shows a configuration of a bank or card association operating a central computer connected to customers and diverse merchants.

The commonality among all system configurations is the fact that the merchandise card account system MC is connected to card issuer locations or purchasing/debiting stations P/DSx that allow merchants and others to operate remote terminals RTx that in turn are connected to computers and networks located in merchant headquarters MH and an account processors AP.

Said remote terminals RTx are connected to merchant headquarters MH and account processor AP stations via a communication system CS. The CS may include telephone lines, satellites, RF frequency devices, or cables.

In the embodiment, purchasing/debiting stations P/DSx are equipped with remote terminals RTx composed of cash registers CRx or POS terminals POSx with keypads KPx, card readers CRx, bar code readers BCRx, printers Px, and display screens DSx to record the amount of funds being entered into a MC account.

Throughout this specification, the term x, when appended to the end of a reference character, is equal to 1, . . . M, . . . N.

Said P/DSx with RTx are located in point of sale merchant retail locations MRL, merchant online sales MOS facilities, direct mail sales DMS facilities, shopping mall offices SMO, bank locations B, and card association locations CA.

In said P/DSx locations, card issuers issue cards and accounts to customers with individual and distinct account identifiers. Once a customer has a card account, the customer can tender cash value to card issuers and the funds will be entered into remote terminals RI via mag stripe cards MSC, smart cards SC, or radio frequency devices RFD for crediting to their MC accounts.

As FIG. 1 shows, after said card is entered into a remote terminal RT at a P/DS location, the RT connects with the merchant headquarters MH and the account processor AP who manages the MC account. When the RT connects with the computers and networks located at MH and the AP, the system captures the critical information needed to immediately convert the entered MC funds into an actual sale, albeit a proxy sale, of merchandise until a final sale is conducted at the time of account debiting.

Effectively, the proxy sale of merchandise has a customer buying a percentage of the merchant's existing inventory using a proxy sale method. The proxy sale represents a "stand in number" until the cardholder makes a final selection from the merchant's inventory. The proxy sale is conducted as an actual sale because when the cash value is entered into the MC account, the issuing merchant applies its average historical operational costs (i.e. sale taxes, cost of goods, overhead costs, and federal taxes) against the amount of cash value being entered into the MC account.

To use the system, customers contact merchants or card issuers and receive a card whereupon they initially load or reload funds (i.e. $10, $50, $100, etc.) into a merchandise card MC account.

Immediately upon loading funds into the MC account, the system converts the "in funds" into a qualified sale of merchandise using a "proxy purchase" algorithm.

In order to be booked as earned revenue from a sale of goods or services, the system allows merchants to effect the "proxy method" by calculating the appropriate deductions for sale taxes, cost of goods, overhead costs, and the cost of federal taxes in order to determine the merchant's retained earnings or after tax net profit.

Under the system, each respective merchant or card issuer will determine its own unique "proxy purchase" by inputting its average costs of sales taxes, goods, overhead, and federal taxes against its overall inventory. Merchants customarily keep such sale records as required by Generally Accepted Accounting Practices (GAAP) in their computer networks located at merchant headquarters MH.

Figure 5:
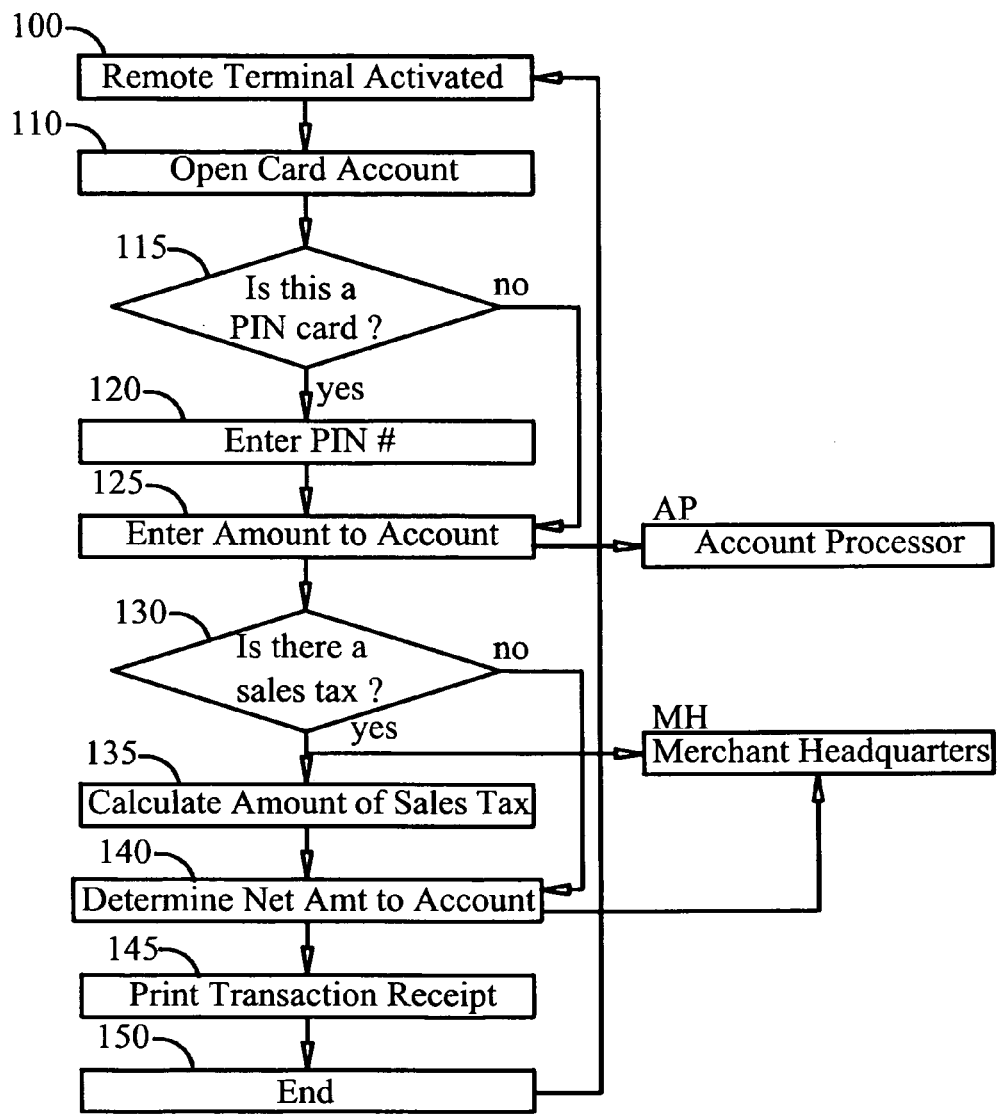
FIG. 5 is a flowchart illustrating the process of opening a merchandise account that is immediately used to make a "proxy purchase" of goods and/or services in accordance with the invention.

The system will now be described in more detail starting with references to FIG. 5, when a customer opens a merchandise card MC and an account.

In step 100, a remote terminal RT has been activated.

In step 110, a customer requests a MC account. Clerk swipes card through the remote terminal RT.

In step, 115 the computer asks if this is a PIN card (personal identification number)?

If the answer is yes, in step 120 the customer enters a PIN number into the terminal.

In step, 115 if the answer is no, the computer goes to step 125.

At step 125, the clerk or customer enters the amount of funds to be initially deposited to the MC account. The computer then connects with the central computer and database in the account processor AP station to report the card and account number, the PIN if there is one, and the amount of cash entered in step 125.

In step 130, the computer connects with the central computer and database in the merchant headquarters MH station, to lookup and report if the merchant has assigned an average sales tax per dollar to its inventory.

In step, 135 the computer applies the sales tax percentage to the amount of cash entered to determine the amount of dollars to be sent to a state tax authority.

In step 140, the computer reports back to the merchant headquarters MC, the amount of sales taxes due produced in the proxy sale.

In step 145, the computer prints out a receipt.

In step 150, the computer returns to step 100 to await the next transaction.

Figure 6:
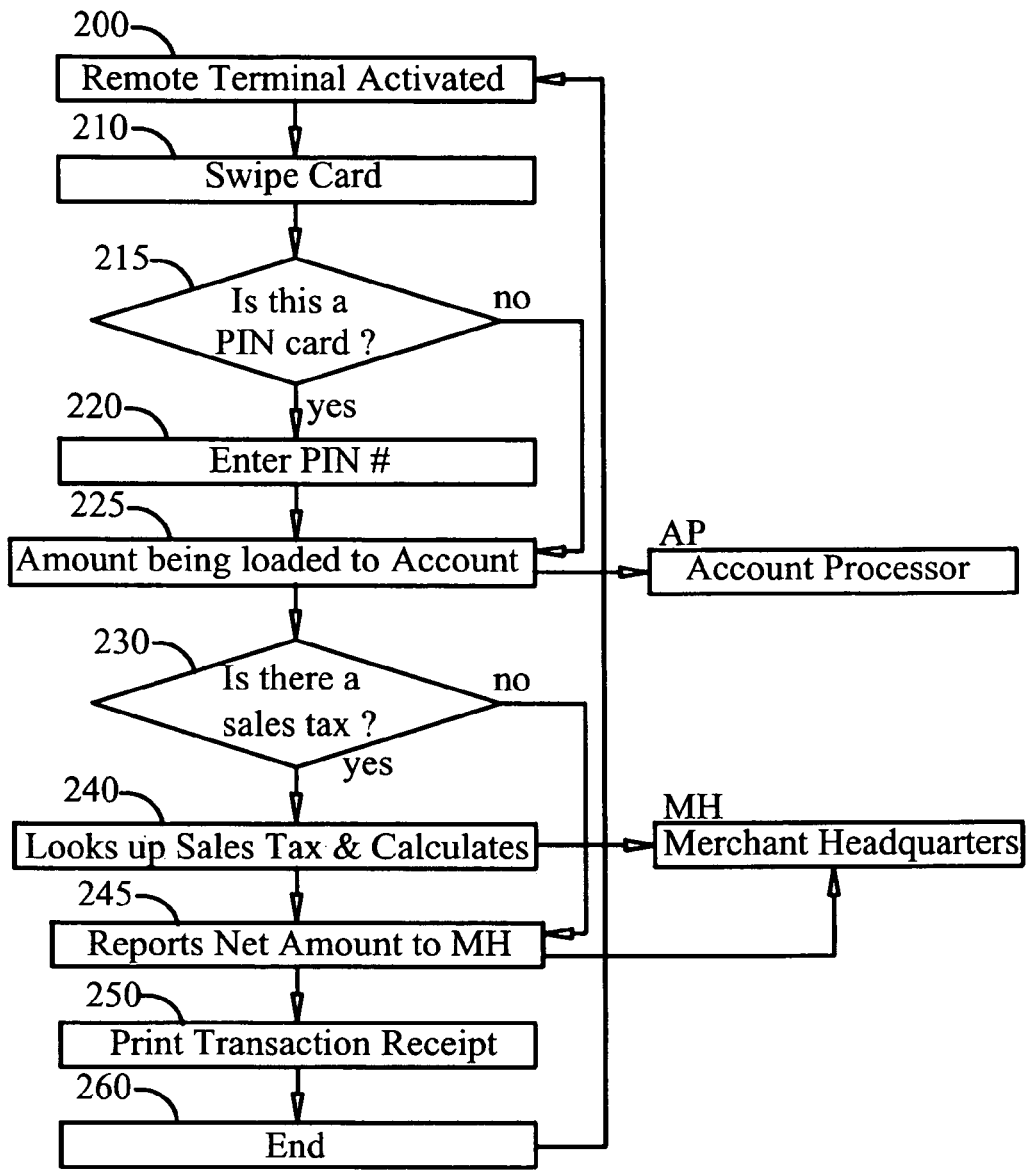
FIG. 6 is a flowchart illustrating the process of loading or reloading cash into account that is immediately used to make a "proxy purchase" of goods and/or services in accordance with the invention.

The system will now be described in more detail starting with references to FIG. 6, when a customer reloads their merchandise card MC and account.

In step 200, a remote terminal has been activated.

In step 210, a card is swiped through the terminal.

In step 215 the computer asks if this is a PIN card?

If the answer is no to step 215, the computer goes to step 225.

If the answer is yes in step 215, the computer goes to step 220 and the customer enters a PIN number into the terminal. The compute then goes to step 225.

At step 225 the computer asks how much is being loaded into the MC account. Once the amount is entered, the computer goes out to the Account Processor AP to report the amount of cash value going in to the MC account.

In step 230, the computer asks is there a sales tax?

If the answer to step 230 is yes, at step 240 the computer goes to the merchant headquarters MC and looks up the proxy sales tax and calculates the amount of sales tax.

In step 245 the computer reports the amount of sales tax and the net amount to merchant headquarters MH.

If the answer is no to step 230, the computer goes to step 245, and the computer reports the net amount to merchant headquarters MH.

In step 250, the computer prints out a receipt.

In step 260, the computer returns to step 200 to await the next transaction.

Figure 7:
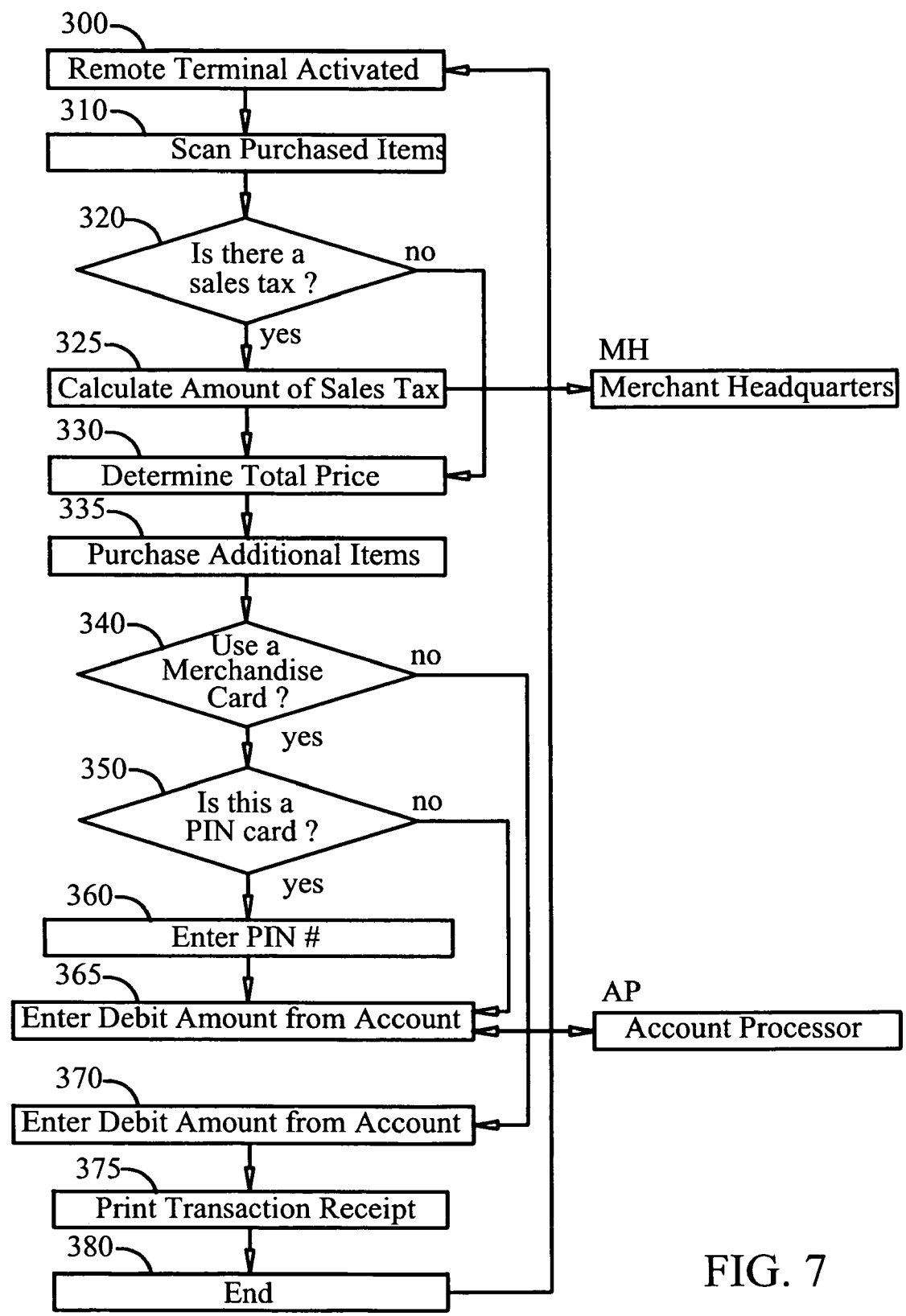
FIG. 7 is a flowchart illustrating the process of a cardholder debiting their account. Here a cardholder can convert any part or percentage of their "total proxy purchases" of goods or services to a "final purchase" of goods or services.

The system will now be described in more detail starting with references to FIG. 7, when a customer uses their merchandise card MC and account to make a debit.

In step 300, a remote terminal has been activated.

In step 310, the computer scans the bar code on an item to be purchased.

In step 320 the computer asks if there is a sale tax on the item?

If the answer is yes, in step 325 the computer looks up the sales tax percentage at merchant headquarters MH and calculates the amount of sales taxes.

In step 330, the computer totals the price of the item and the sales tax.

In step 335, the computer repeats steps 310–330 if additional items are being purchased.

In step 340, the computer asks if the customer wants to use a MC card/account.

If the answer is yes, in step 350, the computer asks if the MC card has a PIN number.

If the answer to step 350 is yes, in step 360 the computer requests the PIN.

In step 365, the computer displays the amount to be debited off the MC account and asks the cardholder to approve the debit from their account. The computer goes to the account processor AP station to gain acknowledgement that the funds are available and the AP computes a new MC card account balance.

If the answer to step 340 is no, in step 370, the computer asks for payment in cash, credit card, ATM card, In step 375, the computer prints out a receipt.

In step 380, the computer returns to step 300.

FIG. 8 shows a list of steps 1–9 in a typical merchant card transaction both funds in and funds out. The following is a hypothetical example of a MC transaction in a convenience store.

In step 1, said POS transaction, #1234, was completed on Mar. 17, 2003 in store #141. The transaction was for $100.00 to go to a gift merchandise account #35-476-12.

The hypothetical store is 1 of the 1,400 stores operated by the chain owner. In step 2–3, the remote terminal RT went online to the chain's headquarters MH, to determine the average sales tax for its transactions was 3%.

In step 4, the RT would go online to the Account Processor AP and record a $100 to account #35-476-12.

In step 5, the RT goes to MH and in step 6, transaction #1234 would show the following accounting: $3.00 due the state, $55.00 cost of goods, $28.00 for business overhead, $6.02 to IRS and $7.98 as after tax net profit to the convenience chain.

As long as transaction #1234 would stay as originally processed, the "proxy" information in the MH would be recorded as the details behind a final sale.

However in step 7, cardholder #35-476-12 went to store #151 and in transaction #6890 the customer debited $15.38 resulting in step 8–9 producing the following records at Merchant Headquarters:

On Apr. 2, 2003 cardholder #35-476-12 debited $15.83 at store #151 performing transaction #6890.

The following two items were purchased:

Item 1—24 cans of premium soda—Price $8.43—Sale Tax 6%=$0.50

Item 2—1 women's blouse—Price $6.45—Sale Tax 0%=$0.00

Total purchase $15.38

The RT will go online to AP station and debit $15.38 leaving a balance of $84.62 on account #35-476-12.

When MH station receives the transaction the 2 records are recorded as follows:

Transaction #1234 is rewritten as $84.36 with the following apportionments:

$2.53 state sales tax $46.40 cost of goods $23.62 overhead costs $11.81netprofit $6.73 after tax profit The debited final sale transaction #6890 is written for $15.38 with the following apportionments:

Item 1—price $8.43

$0.51 state sales tax (@ 6%)

$3.54 cost of goods (@ 42%)

$1.94overheadcosts(((@223%)

$5.99 net profit

Item 2—price $6.45

$0.00 state sales tax (@ 0%)

$3.03 cost of goods (@ 47%)

$1.55overheadcosts(@24%)

$1.87 net profit

Items 1 & 2 After tax profit=$4.48

Once steps 1–9 are taken the system has completed its cycle.

The net results of this total activity is that a customer purchased a merchandise card that can be reloaded and the merchant has a completed sale that can be immediately booked as revenue.

The system provides merchants with an improved way to accept funds into a prepaid card account because when a merchant applies the system "a sale is a sale".

Although the present invention has been described with reference to certain preferred embodiments, various modifications, alterations, and substitutions will be known or obvious to those skilled in the art without departing from the spirit and scope of the invention, as defined by the appended claims.

I claim:

1. A method for a card issuer to allow sale of merchandise to a customer using a merchandise card, comprising:
    using a remote terminal to activate and issue the merchandise card to a customer with an individual account identifier;
    allowing said customer to use the merchandise card to enter a cash value into a remote terminal to purchase a percentage of a merchant's inventory using a proxy method, wherein the proxy method comprises a purchase of proxy merchandise that is exchangeable for other merchandise from the merchant's inventory, and wherein a merchandise account associated with the account identifier is credited with the percentage of the merchant's inventory;
    calculating and reporting the average historical costs associated with the sale of the merchant's inventory; and
    at the time of crediting the merchandise account, making said purchased proxy merchandise available for exchange for other merchandise from the merchant's inventory.

2. A method for performing a purchase transaction, the method comprising:
    activating an account associated with a customer, the account having a unique account identifier;
    accepting a cash value at a purchasing station;
    selling a percentage of inventory, wherein the percentage is based on the cash value and wherein the percentage of inventory comprises proxy merchandise that is exchangeable for other merchandise from the merchant's inventory, and wherein the account is credited the percentage of inventory; and
    calculating and reporting average historical costs associated with sales of the inventory.

3. The method of claim 2 wherein the account is associated with a card.

4. The method of claim 2 wherein the purchasing station comprises a point of sale terminal.

5. The method of claim 2 wherein the purchasing station comprises a cash register.

6. The method of claim 2 further comprising exchanging merchandise for at least a portion of the percentage of inventory, wherein the exchanging comprises exchanging at a debiting station and the debiting station comprises a point of sale terminal.

7. The method of claim 2 further comprising exchanging merchandise for at least a portion of the percentage of inventory, wherein the exchanging comprises exchanging at a debiting station and the debiting station comprises a cash register.

8. The method of claim 2 wherein the average historical costs are selected from the group comprised of sales tax, cost of goods, overhead costs, federal taxes, and any combination thereof.

9. The method of claim 2 further comprising treating the proxy sale as a revenue producing sale, the revenue producing sale generating a net profit equivalent to the difference between the cash value and the average historical costs.

10. The method of claim 2 further comprising exchanging merchandise for at least a portion of the percentage of inventory.

11. The method of claim 2 wherein the account is maintained by an entity and wherein the purchasing station is operated by the entity.

12. The method of claim 11 wherein the entity is a merchant.

13. The method of claim 11 wherein the account is associated with a card and wherein the entity is a card issuer.

14. The method of claim 2 wherein the account is maintained by a first entity and wherein the purchasing station is operated by a second entity.

15. The method of claim 2 further comprising exchanging merchandise for at least a portion of the percentage of inventory, wherein the exchanging comprises exchanging at a debiting station and the debiting station comprises a remote terminal.

16. The method of claim 2 further comprising exchanging merchandise for at least a portion of the percentage of inventory, wherein the exchanging comprises exchanging at a debiting station and the debiting station comprises an online terminal.

17. The method of claim 2 wherein the purchasing station comprises a remote terminal.

18. The method of claim 2 wherein the purchasing station comprises an online terminal.

19. A system for performing a purchase transaction, the system comprising:
   an account processor for activating an account associated with a customer, the account having a unique account identifier;
   a purchasing station coupled to the account processor for accepting a cash value, and for selling a percentage of inventory, wherein the percentage is based on the cash value and wherein the percentage of inventory comprises proxy merchandise that is exchangeable for other merchandise from the merchant's inventory, and wherein the account is credited the percentage of inventory; and
   a server having a database coupled to the purchasing station and the account processor for calculating and reporting average historical costs associated with sales of the inventory.

20. The system of claim 19 wherein the account is associated with a card.

21. The system of claim 19 wherein the purchasing station comprises a point of sale terminal.

22. The system of claim 19 wherein the purchasing station comprises a cash register.

23. The system of claim 19 further comprising a debiting station coupled to the account processor for processing an exchange of merchandise for at least a portion of the percentage of inventory wherein the debiting station comprises a point of sale terminal.

24. The system of claim 19 further comprising a debiting station coupled to the account processor for processing an exchange of merchandise for at least a portion of the percentage of inventory wherein the debiting station comprises a cash register.

25. The system of claim 19 wherein the average historical costs are selected from the group comprised of sales tax, cost of goods, overhead costs, federal taxes, and any combination thereof.

26. The system of claim 19 further comprising accounting software and hardware for treating the proxy sale as a revenue producing sale, the revenue producing sale generating a net profit equivalent to the difference between the cash value and the average historical costs.

27. The system of claim 19 further comprising a debiting station coupled to the account processor for processing an exchange of merchandise for at least a portion of the percentage of inventory.

28. The system of claim 19 wherein the account is maintained by an entity and wherein the purchasing station is operated by the entity.

29. The system of claim 28 wherein the entity is a merchant.

30. The system of claim 28 wherein the account is associated with a card and wherein the entity is a card issuer.

31. The system of claim 19 wherein the account is maintained by a first entity and wherein the purchasing station is operated by a second entity.

32. The system of claim 19 further comprising a debiting station coupled to the account processor for processing an exchange of merchandise for at least a portion of the percentage of inventory wherein the debiting station comprises a remote terminal.

33. The system of claim 19 further comprising a debiting station coupled to the account processor for processing an exchange of merchandise for at least a portion of the percentage of inventory wherein the debiting station comprises an online terminal.

34. The method of claim 19 wherein the purchasing station comprises a remote terminal.

35. The method of claim 19 wherein the purchasing station comprises an online terminal.

* * * * *